US006736611B2

(12) United States Patent
Putt et al.

(10) Patent No.: US 6,736,611 B2
(45) Date of Patent: May 18, 2004

(54) AIRCRAFT FLUID DELIVERY DEVICE

(75) Inventors: James Putt, Doylestown, OH (US); Michael M. Kugelman, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 161 days.

(21) Appl. No.: 10/000,569

(22) Filed: Oct. 23, 2001

(65) Prior Publication Data

US 2002/0088900 A1 Jul. 11, 2002

Related U.S. Application Data

(60) Provisional application No. 60/242,615, filed on Oct. 23, 2000.

(51) Int. Cl.[7] .......................... F04B 17/00; F04B 35/02
(52) U.S. Cl. ................... 417/386; 417/385; 417/225; 417/401; 92/5 R; 244/134 A
(58) Field of Search ..................... 417/225, 384, 417/385, 386, 387, 399, 401; 92/5 R; 244/134 A

(56) References Cited

U.S. PATENT DOCUMENTS

| 3,263,702 | A | | 8/1966 | Pullen et al. ........... 137/625.64 |
|---|---|---|---|---|
| 4,726,282 | A | | 2/1988 | LaBair ..................... 92/5 R |
| 4,807,515 | A | * | 2/1989 | Briscoe et al. ............. 91/346 |
| 4,865,291 | A | * | 9/1989 | Briscoe et al. ........... 251/30.02 |
| 4,878,647 | A | | 11/1989 | Putt et al. ............... 251/30.05 |
| 5,098,061 | A | | 3/1992 | Hohenshil et al. ........ 251/30.05 |
| 5,271,598 | A | | 12/1993 | Hohenshil et al. ........... 251/29 |
| 5,813,313 | A | * | 9/1998 | Stoll et al. ................. 92/5 R |
| 5,906,222 | A | | 5/1999 | Faulstich .................. 137/554 |
| 6,386,841 | B1 | * | 5/2002 | Probst ..................... 417/397 |
| 6,427,576 | B1 | * | 8/2002 | Bock et al. ................. 92/5 R |

FOREIGN PATENT DOCUMENTS

| DE | 31 43 482 A1 | 5/1983 | ............. F15C/4/00 |
|---|---|---|---|
| EP | 0 539 723 A1 | 5/1993 | ........... B64D/15/16 |

OTHER PUBLICATIONS

International Search Report (PCT/ISA/210).

* cited by examiner

Primary Examiner—Charles G. Freay
(74) Attorney, Agent, or Firm—Renner, Otto, Boisselle & Sklar, LLP

(57) ABSTRACT

An aircraft fluid delivery device (10) including a piston assembly (20), a pilot assembly (22), and a control assembly (24). The control assembly (24) includes non-contact proximity sensors (S1, S2) that sense the position of the piston (28) and a controller (80) that controls the pilot assembly (22), and thus the piston assembly (20), based on information received from the sensors (S1,S2). Specifically, the controller (80) energizes a solenoid (72) to cause fluid to flow through the pilot assembly (22) into a large portion of the piston chamber (30) during the compression stroke of the piston (28). When the solenoid (72) is deenergized during the return stroke of the piston (28), or when the delivery device is electrically turned off, an ejector (60) in the pilot assembly (22) generates a vacuum on the pressure side of the wide portion of the piston chamber (30).

44 Claims, 9 Drawing Sheets

AIRCRAFT FLUID DELIVERY DEVICE

RELATED APPLICATION

This application claims priority under 35 U.S.C. §119 (e) to U.S. Provisional Patent Application No. 60/242,615 filed on Oct. 23, 2000. The entire disclosure of this provisional application is hereby incorporated by reference.

FIELD OF THE INVENTION

This invention relates generally as indicated to an aircraft fluid delivery device and, more particularly, to a delivery device that boosts low pressure aircraft engine bleed air to supply high pressure fluid to an on-board pneumatic system.

BACKGROUND OF THE INVENTION

An aircraft will typically include one or more pneumatic systems which are necessary for proper operation during flight. For example, pneumatic deicers installed on the aircraft's wings commonly need a supply of high pressure fluid so that they may rapidly inflate and deflate to remove accumulated ice. To this end, a fluid delivery device is provided to boost low pressure aircraft engine bleed air so that a rapid series of high pressure fluid pulses can be supplied to the pneumatic system.

SUMMARY OF THE INVENTION

The present invention provides an aircraft fluid delivery device having a longer life, increased reliability, faster speed, and/or improved performance when compared to conventional delivery devices. More particularly, the present invention provides an aircraft fluid delivery device comprising a piston assembly, a pilot assembly, and a control assembly. The pilot assembly pilots the piston assembly and the control assembly controls the pilot assembly. Specifically, the control assembly includes non-contact proximity sensors that sense the position of the piston and a controller that controls the pilot assembly, and thus the piston assembly, based on information received from the sensors.

The piston assembly includes a chamber having a low pressure inlet and a high pressure outlet and a piston, which compresses fluid received through the low pressure inlet and exhausts the compressed fluid through the high pressure outlet. The chamber comprises a first chamber portion, which includes an inlet/outlet to the pilot assembly, and a second chamber portion, which includes the low pressure inlet and the high pressure outlet. The piston comprises a first piston portion, which travels within the first chamber portion and a second piston portion, which travels within the second chamber portion. The first chamber portion and the first piston portion have a greater cross-sectional area (e.g., larger diameter) than the second chamber portion and the second piston portion.

The pilot assembly comprises a casing, a poppet within the casing, and a solenoid that is energized to move the poppet from a first position to a second position. When the poppet is in the first position, the pilot assembly defines a first flow path from a low pressure inlet to a vent and, when the poppet is in the second position, the pilot assembly defines a second flow path from the low pressure inlet into the piston chamber. During a return stroke of the piston, the solenoid is not energized so that the poppet is in its first position and fluid from the pressure side of the chamber may vent through the first flow path. During a compression stroke of the piston, the solenoid is energized so that the poppet is in its second position and fluid is introduced into the pressure side of the chamber.

The pilot assembly can include an ejector, which produces a vacuum to suction fluid from the chamber during a return stroke of the piston. The ejector defines a passageway from the low pressure inlet to the vent, including a narrow portion adjacent the low pressure inlet, a wide portion adjacent the vent, and an orifice therebetween. An inlet port from the chamber to the passageway is positioned just upstream of the orifice. When the poppet is in its first solenoid-not-energized position, a vacuum is produced when fluid passes from the narrow portion through the orifice to the wide portion, whereby fluid is suctioned from the piston chamber and flows through the inlet port into the passageway. When the poppet is in its second solenoid-energized position, the ejector's passageway is blocked and fluid flows therearound to fill the piston chamber.

To turn off the fluid delivery device of the present invention, its electrical power supply must simply be terminated. Upon termination, the solenoid will remain in a de-energized state and the poppet will remain in the first position, regardless of the status of the sensors. The low pressure inlet fluid need not be shut off (as is required with conventional aircraft fluid delivery devices) and can continue to be supplied to the pilot assembly so that ejector can produce a vacuum to maintain the piston at the end of its return stroke. Once the electrical supply to the device is switched back on, the solenoid is energized and the piston begins a compression stroke.

The use of non-contact proximity switches and/or the ability of the fluid delivery device to be turned on/off electrically results in less wear-related damage, thereby providing a longer life and increased reliability. Additionally or alternatively, the ejector's generation of a vacuum in the piston chamber during the return stroke of the piston accelerates venting, thereby providing faster speed and improved performance.

These and other features of the invention are fully described and particularly pointed out in the claims. The following descriptive annexed drawings set forth in detail a certain illustrative embodiment of the invention, this embodiment being indicative of but one of the various ways in which the principles of the invention may be employed.

DRAWINGS

DETAILED DESCRIPTION

Figure 1:
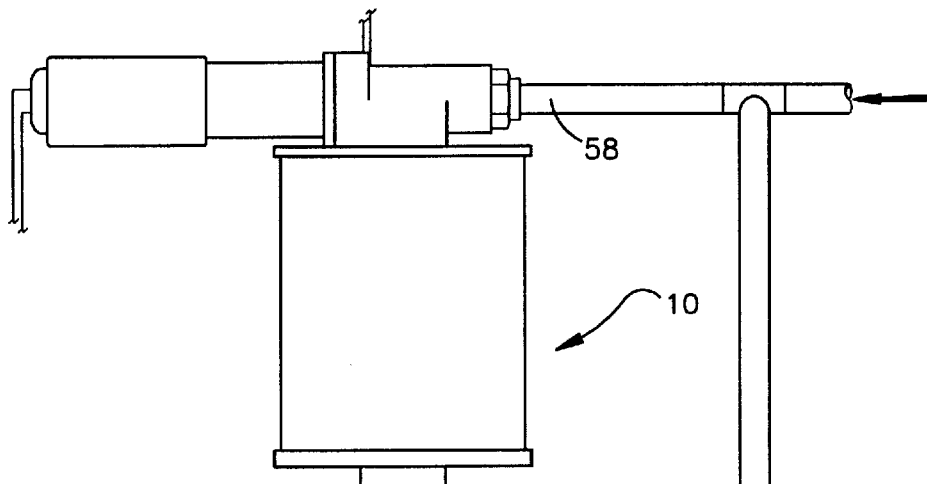
FIG. 1 is a schematic drawing of an aircraft fluid delivery device, according to the present invention, providing high pressure fluid to an aircraft pneumatic system.
Figure 1:
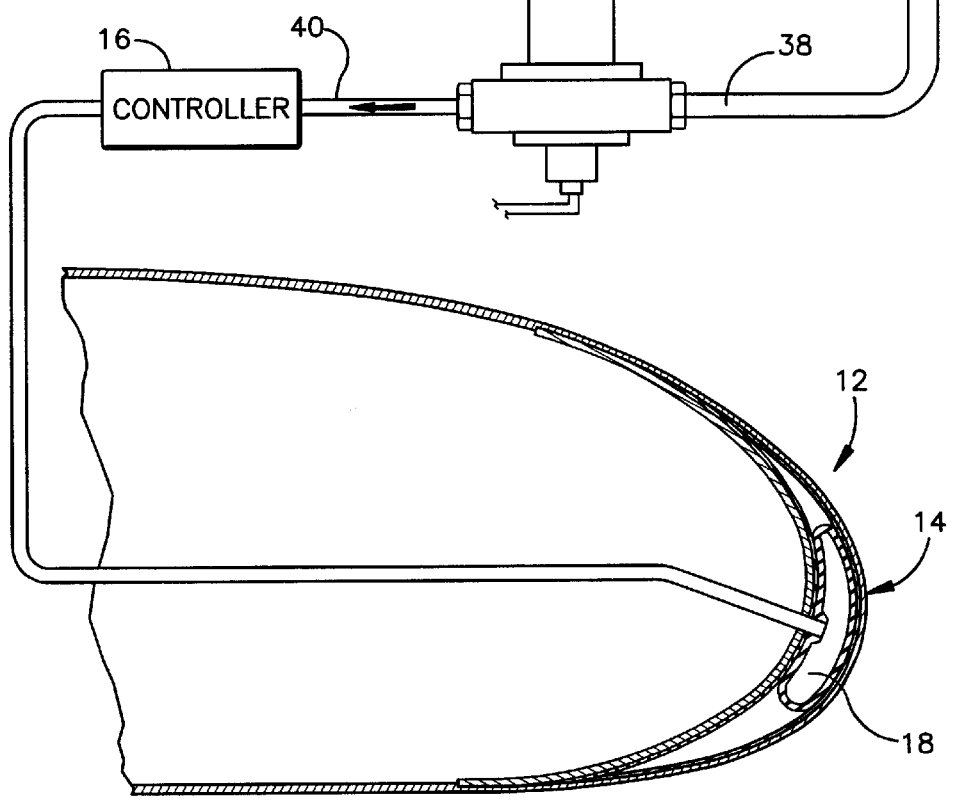

Referring now to the drawings, and initially to FIG. 1, an aircraft fluid delivery device 10 according to the present invention is shown installed on a pneumatic system 12 of an aircraft. In the illustrated embodiment, the aircraft system 12 comprises an expandable panel 14 installed on the wing of the aircraft. A controller 16 positioned downstream of an outlet of the delivery device 10 (namely, high pressure outlet 40, introduced below) controls the flow of fluid to an inflatable chamber 18 in the panel 14. While the delivery device 10 is especially useful on deicers requiring impulses of pneumatic pressure, it can be used on any other appropriate on-board high pressure pneumatic systems required by the aircraft.

Referring now to FIGS. 2A–2E, the fluid delivery device 10 of the present invention is shown in detail. The device 10 comprises a piston assembly 20 which compresses a fluid (e.g., air) to provide a high pressure output, a pilot assembly 22 which pilots the piston assembly 20, and a control assembly 24 which controls the pilot assembly 22. The piston assembly 20 comprises a chamber 26 and a piston 28. The chamber 26 has a large diameter portion 30 and a small diameter portion 32. The large diameter chamber portion 30 has an inlet/outlet 34 and vents 36. The small diameter chamber portion 32 has a low pressure inlet 38 and a high pressure outlet 40, each having a check valve to ensure correct flow direction.

The piston 28 comprises a large diameter portion 42 positioned within the chamber portion 30 and a small diameter portion 44 positioned within the chamber portion 32. During operation of the delivery device 10, the piston portions 42 and 44 travel within their respective chambers 30 and 32 in a compression stroke (see FIGS. 2B–2D) and a return stroke (see FIGS. 2D–2E). An actuator 46 is attached to the upper end (in the illustrated orientation) of the large diameter piston portion 42 and an actuator 48 is attached to the lower end (in the illustrated orientation) of the small diameter piston portion 44.

Figure 5:
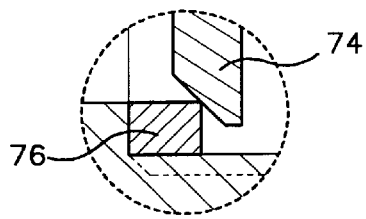
FIG. 5 is an enlarged portion of FIG. 4 showing a flange pushed against a seat when the pilot assembly is in its de-energized condition.
Figure 6:
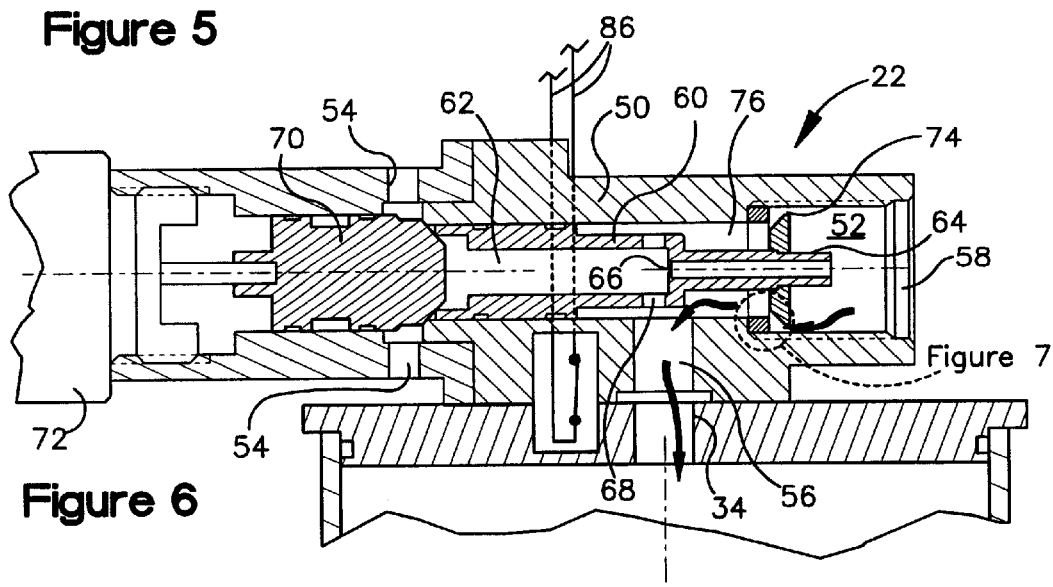
FIG. 6 is an enlarged side elevation view of the pilot assembly in an energized condition.
Figure 7:
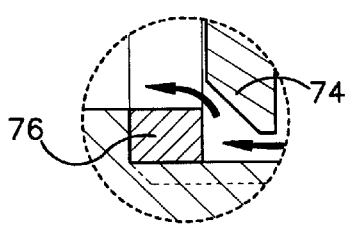
FIG. 7 is an enlarged portion of FIG. 4 showing the flange removed from the seat when the pilot assembly is in the energized condition.

The pilot assembly 22 comprises a casing 50 defining a longitudinal bore 52, vents 54, an inlet/outlet 56, and a low pressure inlet 58. An ejector 60 is positioned within the bore 52 and defines a central passageway between the inlet 58 and the vents 54. More specifically, the ejector's passageway has a wide portion 62, a narrow portion 64, and an orifice 66 therebetween. Ports 68 in the ejector 60 define a passage from the inlet/outlet 56 into the wide central passageway portion 62. A poppet 70 is activated by a solenoid 72 to move from a first position to a second position, thereby shifting the ejector 60 from a first position to a second position. (Compare FIGS. 2A, 2D, 2E, and 4 to FIGS. 2B, 2C and 6.) A flange 74 on the ejector 60 seats against a seat 76 on the casing 50 when the ejector 60 is in its unshifted first position, and is removed therefrom when the ejector 60 is in its shifted second position. (See and compare FIGS. 5 and 7.)

The control assembly 24 comprises a controller 80, which receives position information from sensors S1 and S2 (via signal lines 86 and 88) and controls the solenoid 72 in response to this information (via control lines 90). The sensor S1 senses when the piston 28 is at the end of its return stroke (FIGS. 2A and 2B) and the sensor S2 senses when the piston 28 is at the end of its compression stroke (FIG. 2D). More particularly, the sensor S1 includes a switch, which is closed when the actuator 46 on the large diameter piston portion 42 is positioned adjacent thereto and opened when the actuator 46 moves away therefrom. The sensor S2 includes a switch, which is closed when the actuator 48 in the small diameter piston portion 44 is positioned adjacent thereto and opened with the actuator 48 moves away therefrom. The sensors S1 and S2 can be non-contact proximity sensors with normally-open reed switches and the actuators 46 and 48 can be magnets.

Referring now to FIGS. 3A–3E, a schematic electrical diagram of the circuitry of control assembly 24 is shown. The illustrated circuit operates on normal aircraft voltage (e.g., 28V line 92) and a ground line 94. Q1 is a npn bipolar transistor and Q2 is a P-channel power field effect transistor. Diode D1 provides reverse polarity protection, zener diode D2 provides the voltage to turn on Q2, and diode D3 protects against the inductive "kick" of the solenoid 72 when it is turned off. R1 is a current limiting resistor for diode D2, R3 is a resistor that limits the current supplied to the base of Q1, R4 is a base pull down resistor to prevent collector-to-base leakage current from turning on Q1 inadvertently, and R5 is a current limiting resistor to protect the contacts of the sensors S1 and S2.

D2, R1, and Q1 are connected in series between lines 92 and 94, and the base of Q1 is connected to the node between R3 and R4. Q2, R2, R3, and R4 are connected in series between lines 92 and 94 and the gate of Q2 is connected to the node between R1 and D2. The solenoid 72 (lines 90) is connected between ground line 94 and the node between Q2 and R2. The sensor S1 (lines 86) and R1 are connected in series between the 28V line 92 and the node between R2 and R3. The sensor S2 (lines 88) is connected between the ground line 94 and the node between R2 and R3.

Figure 2A:
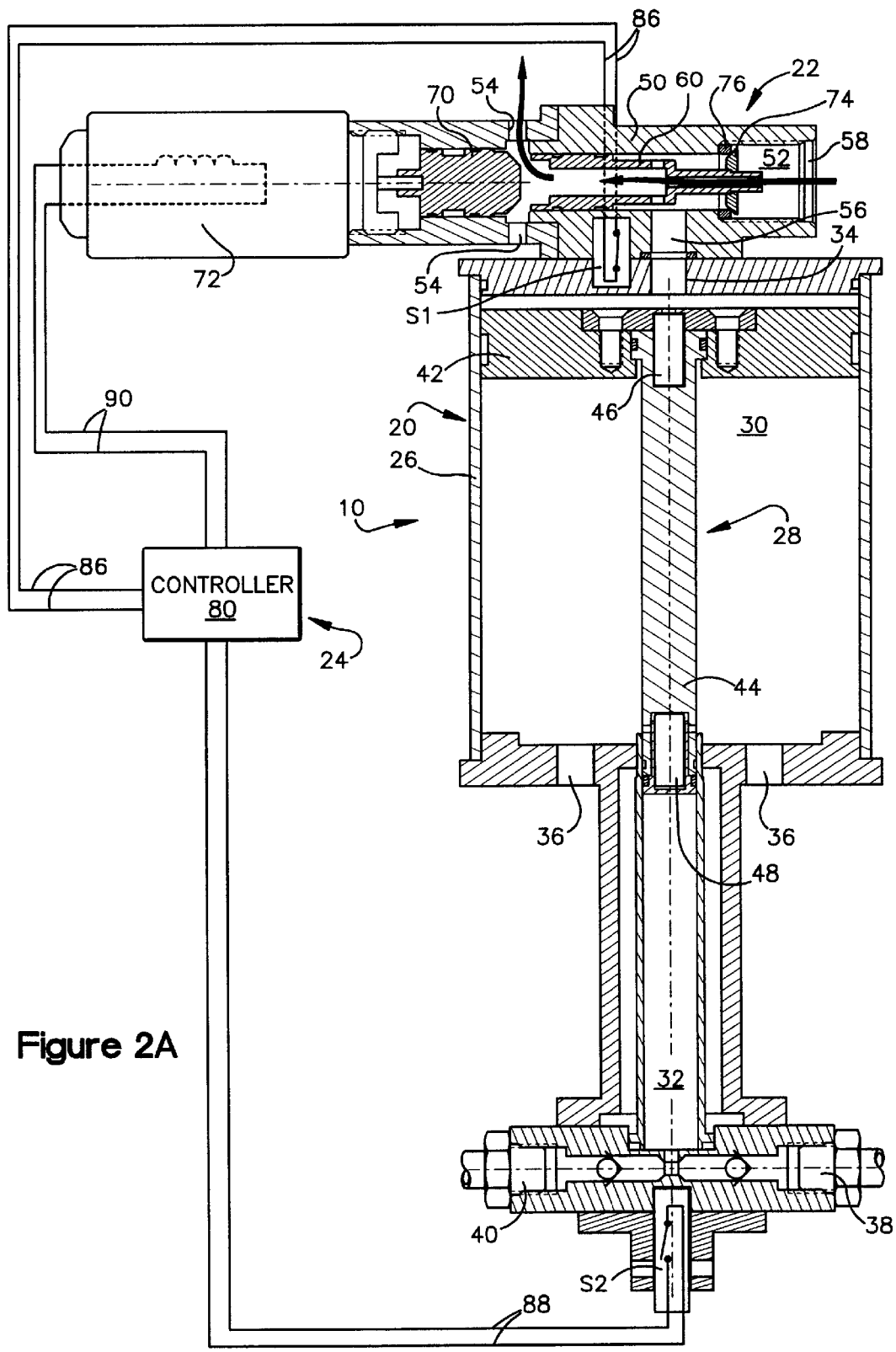
FIGS. 2A–2E are side elevation views in partial cross-section showing the aircraft fluid delivery device at different stages of compression and return.
Figure 3A:
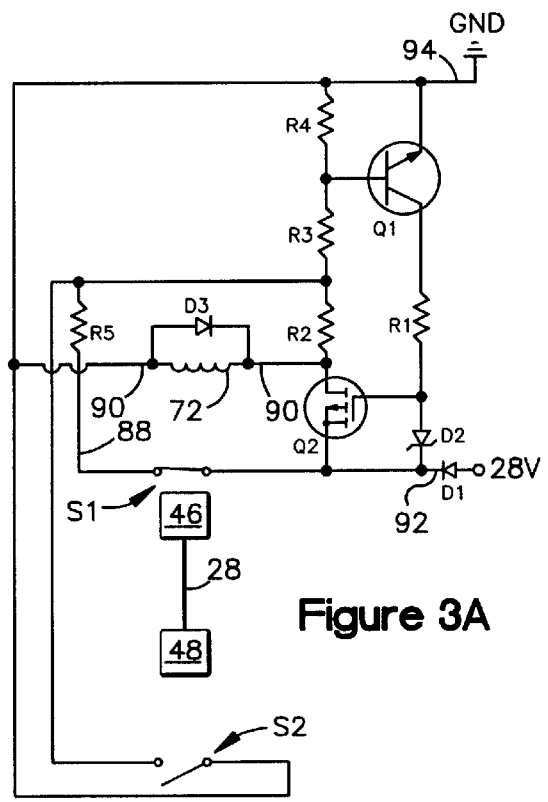
FIGS. 3A–3E are electrical schematic diagrams of the circuitry of the aircraft fluid delivery device in the stages shown in FIGS. 2A–2E, respectively.

FIGS. 2A and 3A correspond to the fluid delivery device 10 when it is electrically shut off. The piston 28 is at the end of its return stroke, whereby the sensor S1 is in a closed position (due to the proximity of the actuator 46) and the sensor S2 is in an open position (due to remoteness of the actuator 48). Since there is no power to the circuit, the solenoid 72 is not energized, whereby the poppet 70 is in its first non-extended position and the ejector 60 is in its first non-shifted position. This positioning of the poppet 70 and the ejector 60 results in the outlet of the wide passageway portion 62 being open and the sealing flange 74 being seated on the seat 76. (See FIGS. 4 and 5.) Low pressure bleed air entering the low pressure inlet 58 flows through the ejector's narrow passageway portion 64, through the orifice 66, and through the wide passageway portion 62 to the vents 54. This flow pattern results in a vacuum being produced just upstream of the orifice 66, thereby suctioning fluid from the piston chamber portion 30 through the inlet/outlet 56, and thereby maintaining the piston 28 at the end of its return stroke.

Figure 2B:
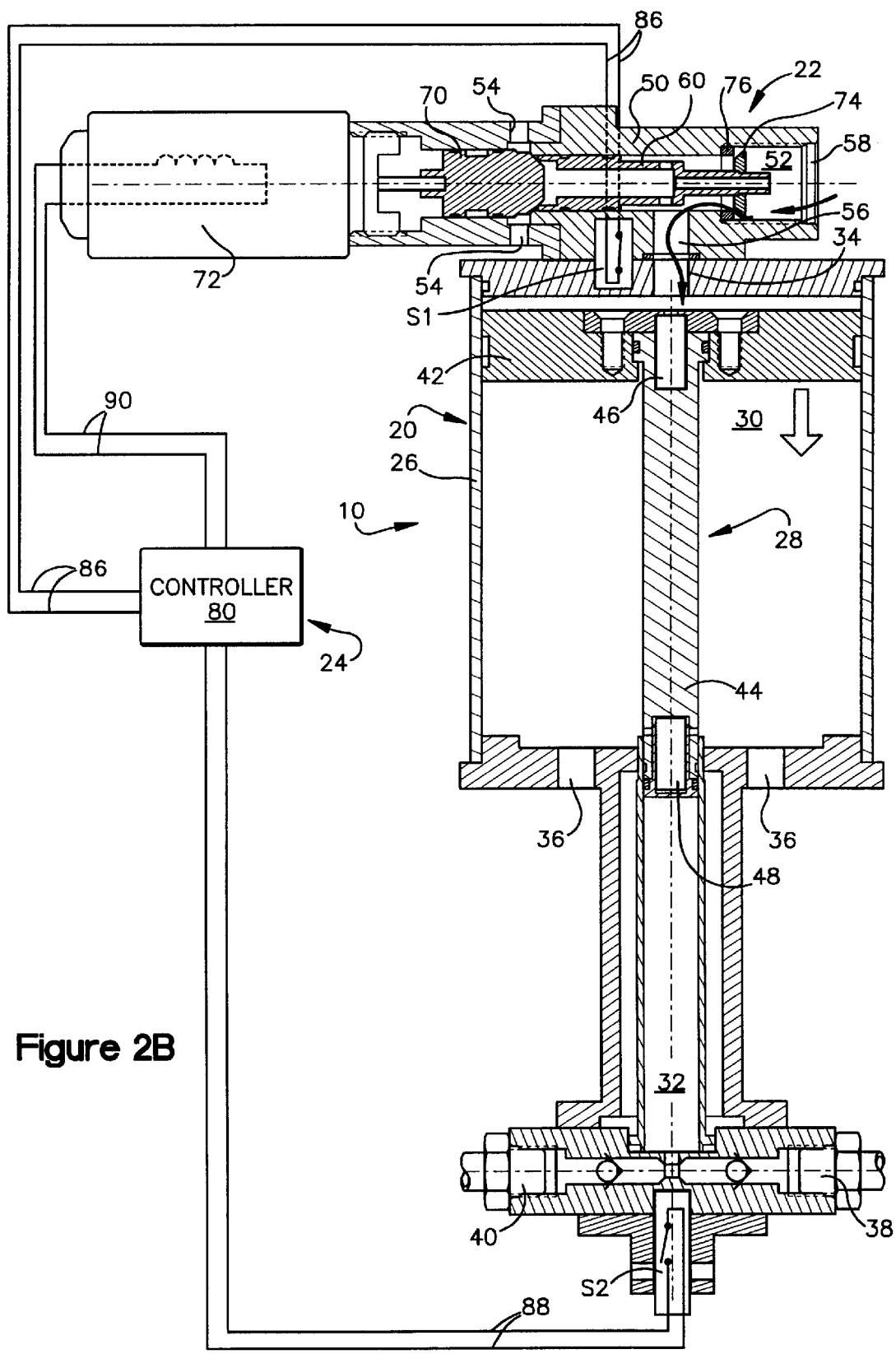
Figure 3B:
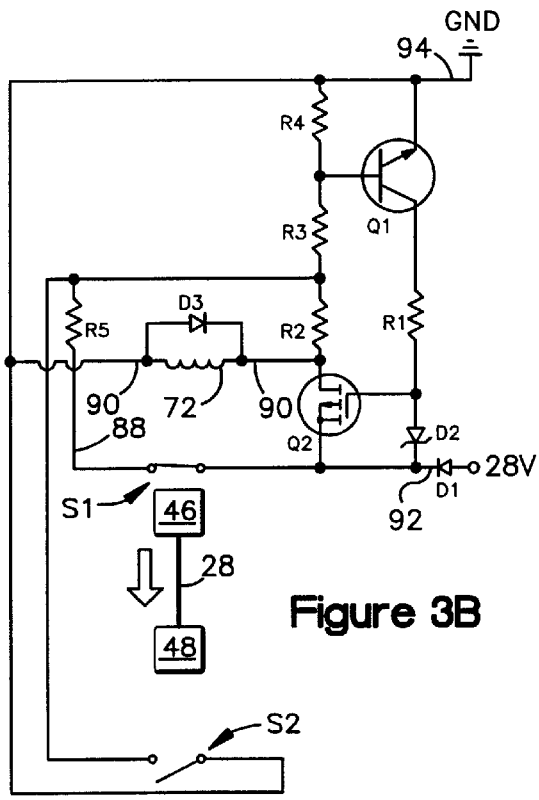

FIGS. 2B and 3B correspond to the fluid delivery device 10 when it is turned on and just about to begin a compression stage. The piston 28 is still at the end of its return stroke, whereby the sensor S1 is closed and the sensor S2 is open. The closed switch of sensor S1 supplies base current to Q1 through R3 and R5 turning Q1 on, whereby the voltage developed across D2 turns on Q2. When Q2 turns on, it applies voltage to energize the solenoid 72, whereby the poppet 70 is pushed to its extended second position. This positioning of the poppet 70 results in the outlet end of the ejector's wide passageway portion 62 being sealed, and also in shifting the ejector 60 to its second position so that the openings in the flange 74 is no longer seated on the seat 76. (See FIGS. 6 and 7.) Inlet air enters the low pressure inlet 58, flows around the flange 74 and through the inlet/outlet 56 into the piston chamber 30.

Figure 2C:
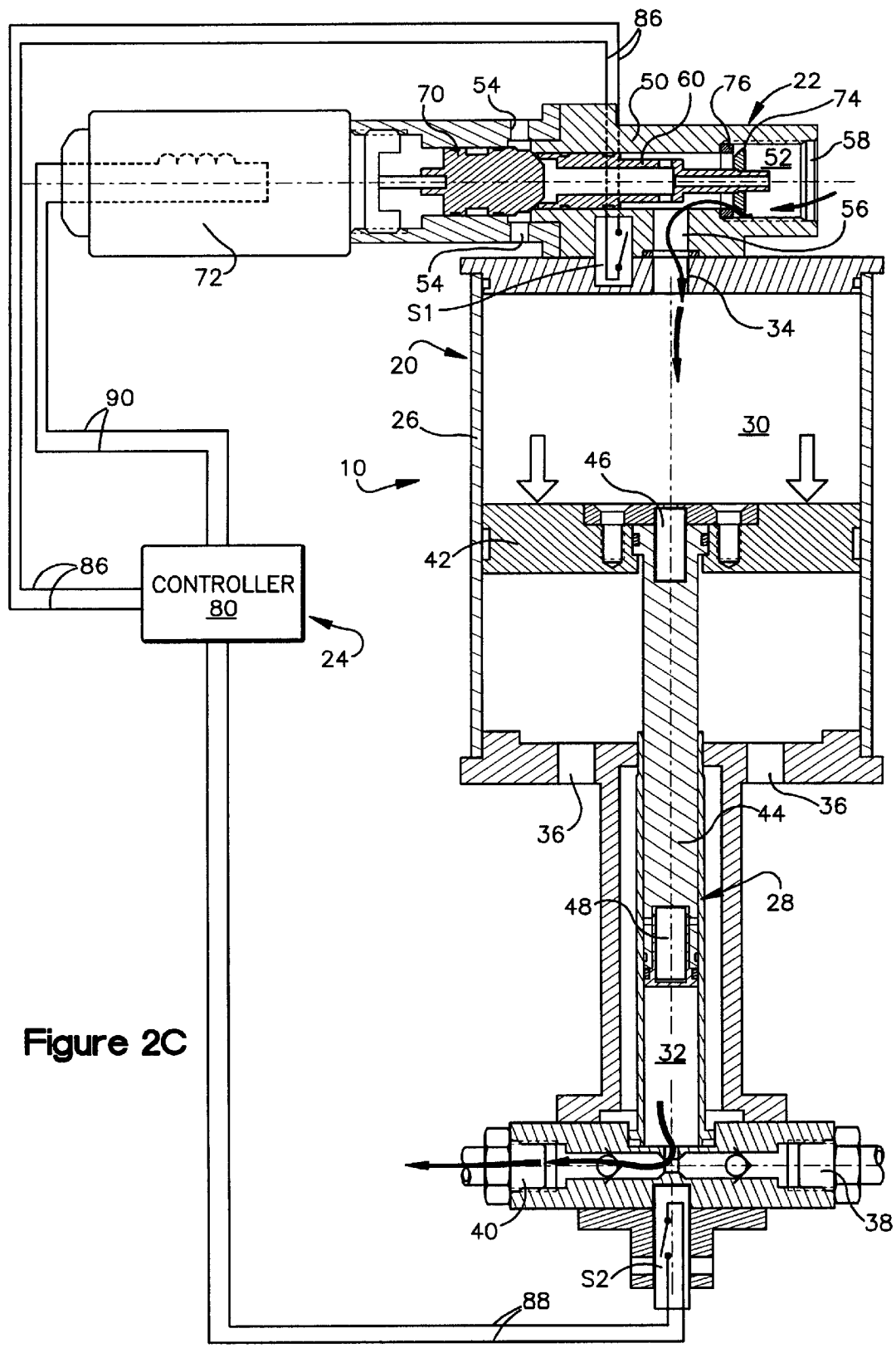
Figure 2D:
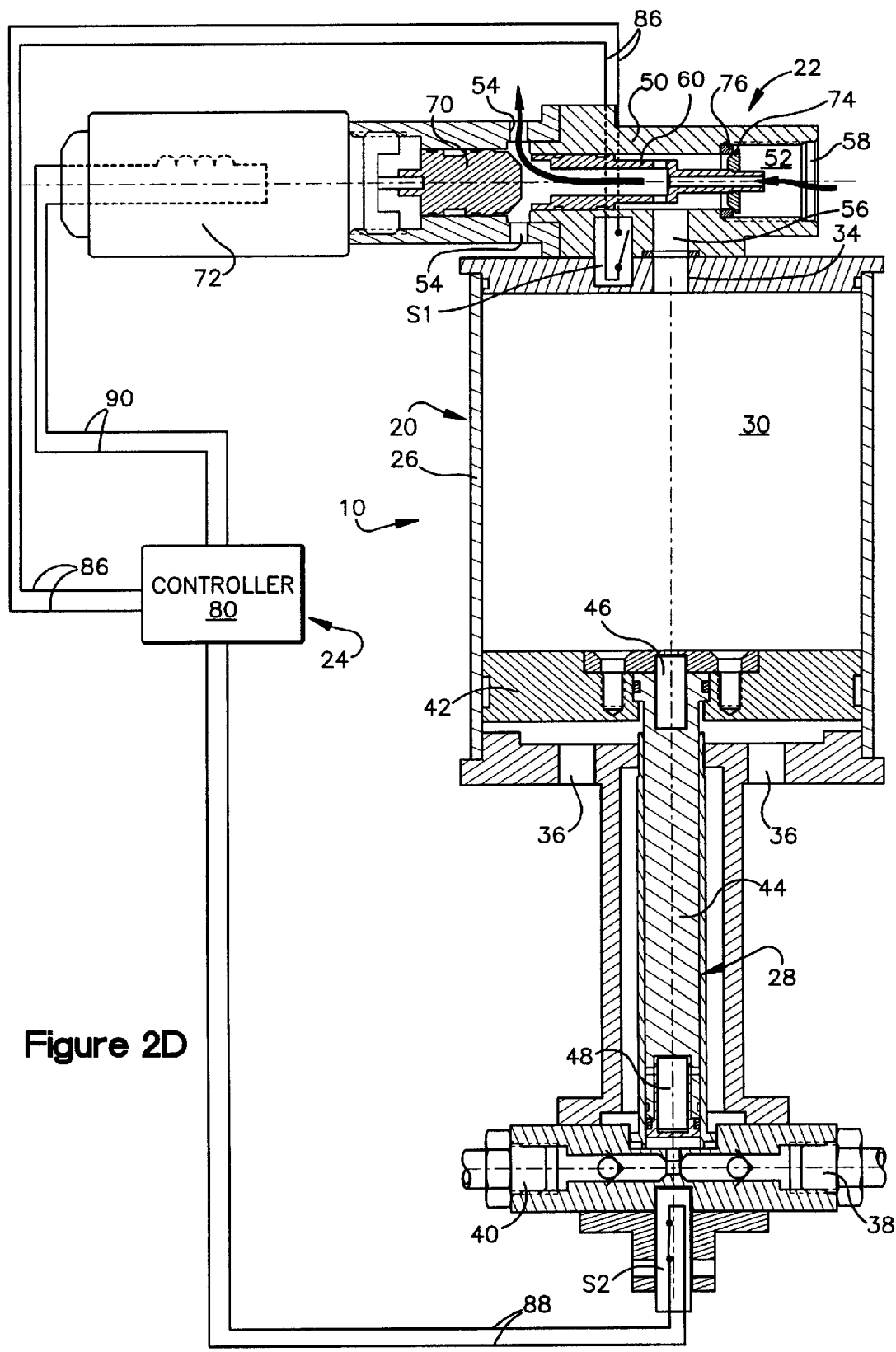
Figure 3C:
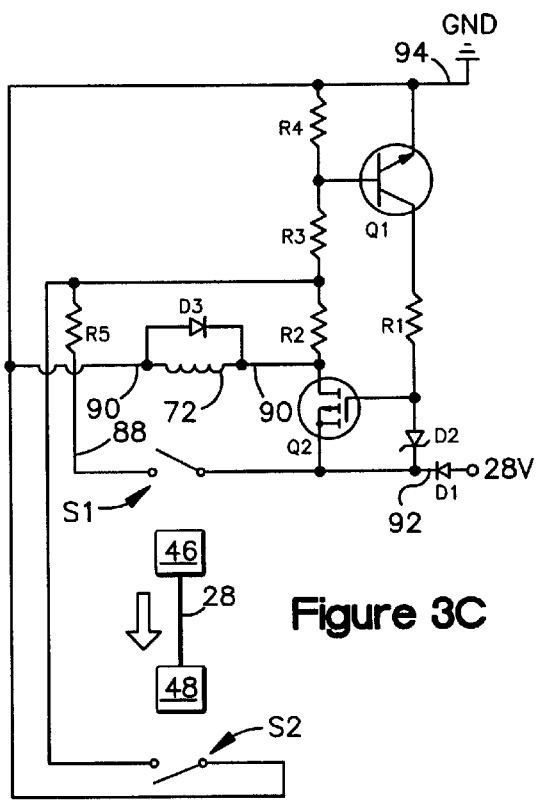

FIGS. 2C and 3C correspond to the fluid delivery device 10 during a compression stage. As the piston 28 moves in the compression direction, the sensor S1 is open (since the actuator 46 has moved away from it) and the sensor S2 is also open (since the actuator 48 has not yet reached it). The solenoid 72 remains energized because Q2 keeps Q1 turned on holding the circuit in a latched-on condition. Inlet air from the pilot's low pressure inlet 58 continues to flow into the pressure side of the piston chamber portion 30 while the vents 36 allow air on the compression side of the piston chamber portion 30 to exit. Air within the small diameter chamber portion 32 is pushed by the small diameter piston portion 44 through the high pressure outlet 40, thereby providing a pulse of pressurized fluid to the connected aircraft system.

Figure 3D:
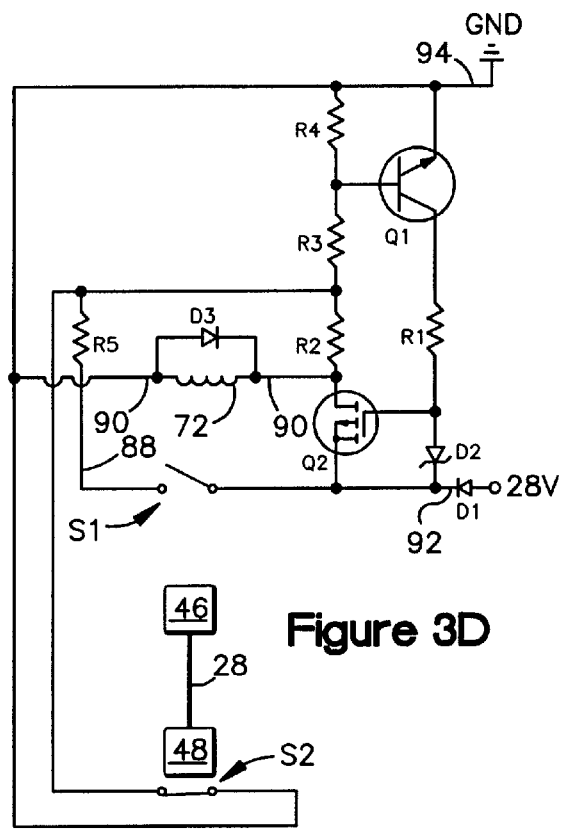

FIGS. 2D and 3D correspond to the fluid delivery device 10 at the end of a compression stage. As the piston 28 reaches the end of a compression stroke, sensor S2 closes because of the close proximity of the actuator 48. (Sensor S1 remains open since the actuator 46 is still remote therefrom.) The closing of sensor S2 shorts the base current of Q1 to the ground, which de-latches the circuit by turning off Q1 and Q2, thereby de-energizing the solenoid 72. The poppet 70 is returned to its first position, thereby reopening the outlet of the ejector's wide passageway portion 62. The ejector 60 is shifted back to its first position by the force of the inlet fluid on its facing surface, thereby re-seating the sealing flange 74. (See FIGS. 4 and 5.) Inlet air passing through the ejector orifice 66 on route to the vents 54 begins suctioning fluid from the piston chamber portion 30, thereby encouraging the piston 28 in the return direction.

Figure 2E:
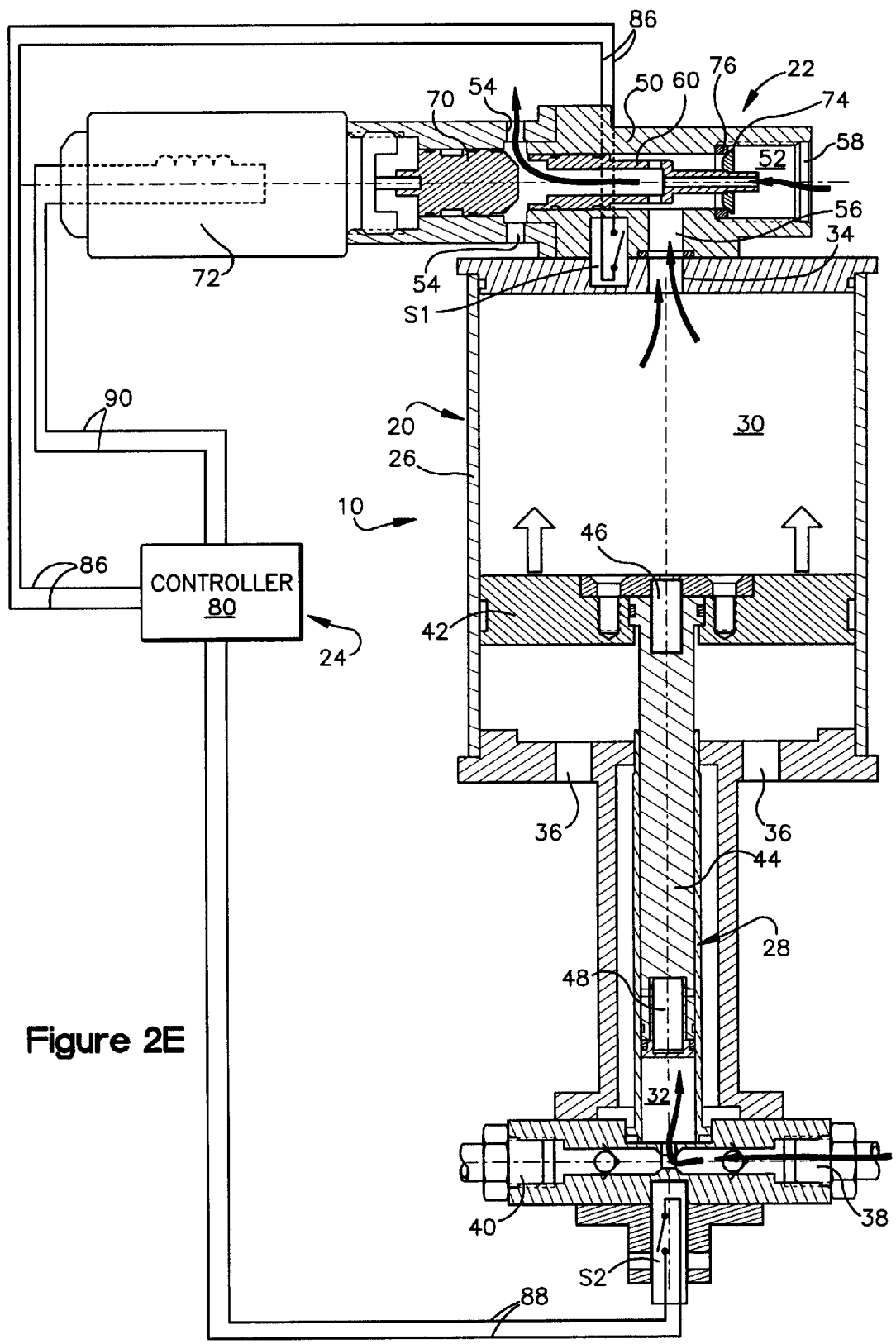
Figure 3E:
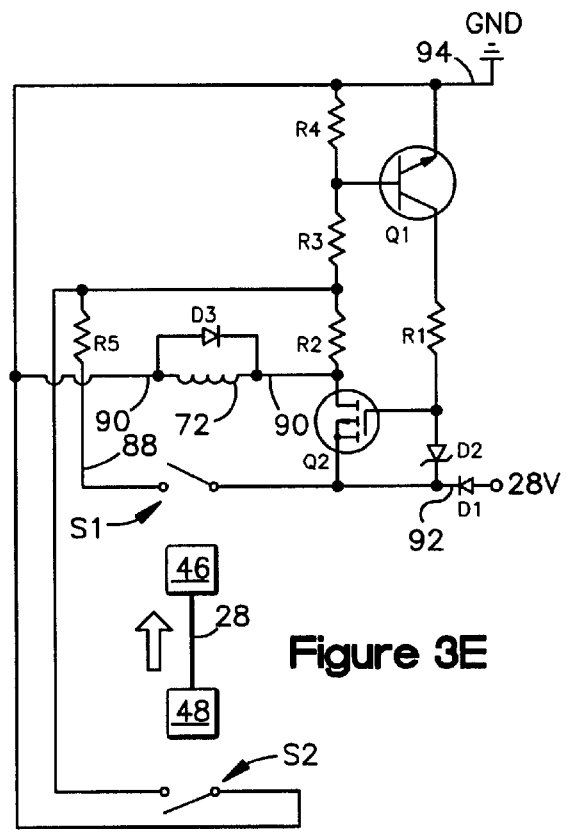
Figure 4:
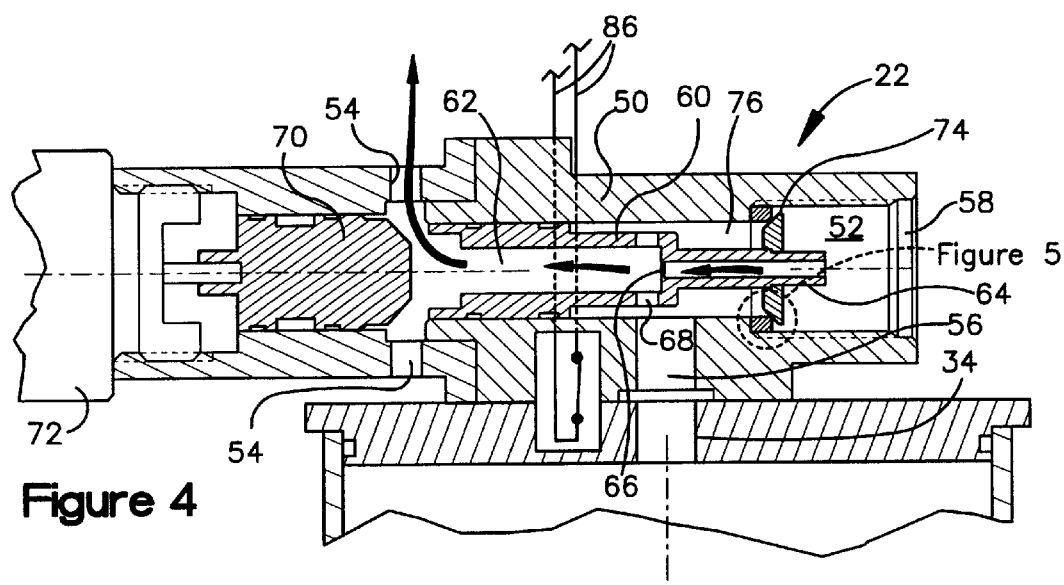
FIG. 4 is an enlarged side elevation view of a pilot assembly of the aircraft fluid delivery device, the pilot assembly being shown in a de-energized condition.

FIGS. 2E and 3E correspond to the fluid delivery device 10 during the return stage. As the piston 28 moves in the return direction, the sensor S2 opens as the actuator 48 moves away from it. The movement of the piston portion 44 causes a void within the small diameter chamber portion 32, whereby air enters thereinto through the low pressure inlet 38. The solenoid 72 remains de-energized as sensor S1 remains open (since the actuator 46 is not yet in close proximity), whereby the suctioning action of the pilot assembly 22 continues to exhaust of air from the chamber portion 30 and move the piston 28 in the return direction.

When the delivery device 10 completes the return stage (e.g., when the piston 28 reaches the end of its return stroke), it once again corresponds to FIGS. 2B and 3B. The sensor S1 is closed, the solenoid 72 is energized, and inlet air from the pilot's low pressure inlet 58 flows around the flange 74 to fill the piston chamber portion 30. These compression and return stages (FIGS. 2B–2E and 3B–3E) are repeated to provide sequential pulses of pressurized air to the aircraft system.

Accordingly, the present invention provides an aircraft fluid delivery device 10 having a longer life, increased reliability, faster speed, and/or improved performance when compared to conventional delivery devices. Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. An aircraft fluid delivery device comprising:
   a piston assembly including a chamber having a low pressure inlet and a high pressure outlet and a piston, which compresses fluid received through the low pressure inlet and exhausts the compressed fluid through the high pressure outlet;
   a pilot assembly, which pilots the piston assembly;
   a control assembly, which includes non-contact proximity sensors that sense the position of the piston and a controller that controls the pilot assembly, based upon the information received from the sensor; and
   wherein the high pressure outlet is connected to a deicer.

2. An aircraft fluid delivery device as set forth in claim 1, wherein actuators are attached to the piston which activate the sensors when in close proximity thereto.

3. An aircraft fluid delivery device as set forth in claim 2, wherein the sensors comprise switches which open/close in response to the actuators.

4. An aircraft fluid delivery device as set forth in claim 3, wherein the actuators comprise magnets.

5. An aircraft fluid delivery device as set forth in claim 1, wherein the sensors comprise a first sensor, which senses when the piston has completed a compression stroke, and a second sensor, which senses when the piston has completed a return stroke.

6. An aircraft fluid delivery device as set forth in claim 1, wherein the chamber comprises a first chamber portion, which includes an inlet/outlet to the pilot assembly, and a second chamber portion, which includes the low pressure inlet and the high pressure outlet, wherein the piston comprises a first piston portion, which travels within the first chamber portion, and a second piston portion, which travels within the second chamber portion; and wherein the first chamber portion and the first piston portion have a greater cross-sectional area than the second chamber portion and the second piston portion.

7. An aircraft fluid delivery device as set forth in claim 6, wherein the sensors comprise a first sensor, which senses when the piston has completed a return stroke, and a second sensor, which senses when the piston has completed a compression stroke, wherein the piston assembly comprises a first actuator attached to the first piston portion, which activates the first sensor when in close proximity thereto, and a second actuator attached to the second piston portion, which activates the second sensor when in close proximity thereto.

8. An aircraft fluid delivery device as set forth in claim 7, wherein the first sensor comprises a normally open switch closed when the first actuator is in close proximity thereto, and/or wherein the second sensor comprises a normally open switch closed when the second actuator is in close proximity thereto.

9. An aircraft fluid delivery device as set forth in claim 1, wherein the pilot assembly includes a solenoid and wherein the controller energizes/ de-energizes the solenoid based on the information received from the sensors.

10. An aircraft fluid delivery device as set forth in claim 9, wherein the controller energizes the solenoid based on information from a first of the sensors that the piston has completed either a compression stroke or a return stroke.

11. An aircraft fluid delivery device as set forth in claim 10, wherein the controller energizes the solenoid based on the first sensor sensing that piston has completed a return stroke.

12. An aircraft fluid delivery device as set forth in claim 11, wherein the controller de-energizes the solenoid based on a second of the sensors sensing that the piston has completed a compression stroke.

13. An aircraft fluid delivery device as set forth in claim 12, wherein the first sensor comprises a normally open switch closed when the first actuator is in close proximity thereto, and/or wherein the second sensor comprises a normally open switch closed when the second actuator is in close proximity thereto.

14. An aircraft fluid delivery device as set forth in claim 13, wherein the controller includes circuitry with latching elements, which latch upon closing of the switch of the first sensor and remain latched until the switch of the second sensor is closed.

15. An aircraft fluid delivery device as set forth in claim 9, wherein the pilot assembly includes a casing and a poppet, which moves within the casing between a first position and a second position in response to the energization/de-energization of the solenoid.

16. An aircraft fluid delivery device as set forth in claim 15, wherein the casing has a low pressure inlet, an inlet/outlet to the piston chamber, and a vent, and wherein the pilot assembly defines a first flow path from the low pressure inlet to the vent when the poppet is in the first position, and defines a second flow path from the low pressure inlet to the chamber when the poppet is in the second position.

17. An aircraft fluid delivery device as set forth in claim 16, wherein the poppet is moved to the second position by energization of the solenoid, whereby the pilot assembly defines the second flow path from the low pressure inlet to the chamber.

18. An aircraft fluid delivery device as set forth in claim 17, wherein a first of the sensors senses when the piston has reached the end of a return stroke and wherein the controller, based on this information from the first sensor, energizes the solenoid, whereby the pilot assembly defines the second flow path from the low pressure inlet to the chamber to fill a pressure side of the chamber during a subsequent compression stroke of the piston.

19. An aircraft fluid delivery device as set forth in claim 18, wherein the controller continues to energize the solenoid until the piston completes the subsequent compression stroke.

20. An aircraft fluid delivery device as set forth in claim 19, wherein the controller comprises control circuitry with latching elements, which latch the power supply to the solenoid until the piston completes the subsequent compression stroke.

21. An aircraft fluid delivery device as set forth in claim 20, wherein a second of the sensors senses when the piston has reached the end of a compression stroke and wherein the controller, based on this information from the second sensor, de-energizes the solenoid, whereby the pilot assembly defines the first flow path from the low pressure inlet to the vent.

22. An aircraft fluid delivery device as set forth in claim 16, wherein when electrical power is shut off to the controller, the solenoid is de-energized, whereby the poppet remains in the first position and whereby the pilot assembly defines the first flow path from the low pressure inlet to the vent.

23. An aircraft fluid delivery device as set forth in claim 16, wherein the pilot assembly further comprises an ejector, which produces a vacuum to suction fluid from the chamber when the poppet is in its first position.

24. An aircraft fluid delivery device comprising a piston assembly and a pilot assembly that pilots the piston assembly;
the piston assembly, including a chamber having a low pressure inlet and a high pressure outlet, and a piston which compresses fluid received through the low pressure inlet and exhausts the compressed fluid through the high pressure outlet;
the pilot assembly including an ejector which produces a vacuum to suction fluid from the chamber during a return stroke of the piston; and
wherein the high pressure outlet is connected to a deicer.

25. An aircraft fluid delivery device as set forth in claim 24, wherein the pilot assembly comprises a casing and wherein the ejector shifts within the casing between a first position, whereat low pressure fluid flows therethrough to a vent, and a second position, whereat low pressure fluid flows therearound to the piston chamber.

26. An aircraft fluid delivery device as set forth in claim 25, wherein the casing has a low pressure inlet and wherein the ejector defines a passageway from the low pressure inlet to the vent and a passage from the chamber to the passageway and wherein the passageway is blocked when the ejector is in its second position.

27. An aircraft fluid delivery device as set forth in claim 26, wherein the ejector's passageway comprises a narrow portion adjacent the low pressure inlet, a wide portion adjacent the vent, and an orifice therebetween, whereby the vacuum is produced when fluid passes from the narrow portion through the orifice to the wide portion when the ejector is in its first position.

28. An aircraft fluid delivery device as set forth in claim 27, wherein the passage from the chamber to the passageway comprises an inlet port into the wide portion of the passageway just upstream of the orifice, and wherein fluid suctioned from the chamber flows through this inlet port into the passageway.

29. An aircraft fluid delivery device as set forth in claim 26, wherein the pilot assembly further comprises a member, which defines a passage from the low pressure inlet to the chamber when the ejector is in its second position, and wherein this passage is blocked when the ejector is in its first position.

30. An aircraft fluid delivery device as set forth in claim 29, wherein the member comprises a flange attached to the ejector and movable therewith between the first position and the second position, wherein the flange seats against a seat when the ejector is in its first position and that is removed from the seat when the ejector is in its second position.

31. An aircraft fluid delivery device as set forth in claim 30, wherein the flange comprises a surface which is pushed by fluid flowing through the low pressure inlet to thereby shift the ejector to its first position.

32. An aircraft fluid delivery device as set forth in claim 26, wherein the pilot assembly comprises a solenoid, which is energized/de-energized to move the ejector between the first position and the second position.

33. An aircraft fluid delivery device as set forth in claim 32, wherein the solenoid is energized to move the ejector to the second position, whereby when power to the device is turned off, the ejector will remain in the first position.

34. An aircraft fluid delivery device comprising:
a chamber, which has a low pressure inlet and a high pressure outlet;
a piston, which compresses fluid received through the low pressure inlet and exhausts the compressed fluid through the high pressure outlet;
an ejector, which moves from a first position to a second position during a return stroke of the piston to produce a vacuum to suction fluid from the chamber;
a non-contact proximity sensor, which senses when the piston completes a compression stroke, and
a controller, which moves the ejector to the second position based on information received from the sensor.

35. An aircraft fluid delivery device as set forth in claim 34, further comprising an actuator, which is attached to a return end of the piston and which activates the sensor when in close proximity thereof.

36. An aircraft fluid delivery device as set forth in claim 35, wherein the sensor comprises a switch, wherein the actuator comprises a magnet, and wherein the switch is closed when the actuator is in close proximity thereto.

37. An aircraft fluid delivery device as set forth in claim 36, further comprising a solenoid, which the controller energizes upon closing of the switch of the sensor, and a poppet, which moves from a first position to a second position in response to the solenoid being energized to shift the ejector to the second position.

38. An aircraft fluid delivery device as set forth in claim 37, wherein the solenoid remains energized until the piston completes its return stroke.

39. An aircraft fluid delivery device as set forth in claim 38, wherein the controller includes a control circuit with latching members, which latch upon closing of the switch of the sensor, and which remain latched until the piston completes its return stroke.

40. An aircraft fluid delivery device as set forth in claim 34, further comprising a solenoid, which is energized to move the ejector to the second position, whereby when power to the device is turned off, the ejector will remain in the first position.

41. In combination, a fluid-activated aircraft system and the fluid delivery device of claim 34 delivering high pressure fluid to the system.

42. The combination set forth in claim 41, wherein the aircraft system comprises a panel having an inflatable chamber.

43. The combination set forth in claim 41, wherein the aircraft system comprises a pneumatic deicer.

44. A method of removing ice from an aircraft, comprising the steps of:
    installing a pneumatic deicer on the aircraft; and
    connecting the high pressure outlet of the fluid delivery device of claim 34 to the pneumatic deicer.

* * * * *